US009087410B2

(12) United States Patent
Seetharamaiah et al.

(10) Patent No.: US 9,087,410 B2
(45) Date of Patent: Jul. 21, 2015

(54) RENDERING GRAPHICS DATA USING VISIBILITY INFORMATION

(71) Applicant: QUALCOMM Incorporated, San Diego, CA (US)

(72) Inventors: Avinash Seetharamaiah, Chuluota, FL (US); Murat Balci, Orlando, FL (US); Christopher Paul Frascati, Oviedo, FL (US); Andrew E. Gruber, Arlington, DC (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 13/744,111

(22) Filed: Jan. 17, 2013

(65) Prior Publication Data
US 2014/0198119 A1 Jul. 17, 2014

(51) Int. Cl.
G06T 11/40 (2006.01)
G06T 15/30 (2011.01)
G09G 5/00 (2006.01)
G06T 15/00 (2011.01)

(52) U.S. Cl.
CPC .............. G06T 11/40 (2013.01); G06T 15/005 (2013.01)

(58) Field of Classification Search
USPC ......... 345/418–419, 423, 581–582, 501–502, 345/544–545, 552, 555, 629; 707/705, 828
See application file for complete search history.

(56) References Cited

U.S. PATENT DOCUMENTS

| 7,843,463 | B1* | 11/2010 | Kilgard ......................... 345/584 |
| 2008/0170066 | A1* | 7/2008 | Falchetto ...................... 345/419 |
| 2009/0066694 | A1 | 3/2009 | Redshaw et al. |
| 2010/0177105 | A1 | 7/2010 | Nystad et al. |
| 2011/0090220 | A1 | 4/2011 | Molnar et al. |
| 2011/0102440 | A1 | 5/2011 | Yuen et al. |
| 2011/0102448 | A1 | 5/2011 | Hakura et al. |
| 2013/0120380 | A1* | 5/2013 | Kallio et al. .................. 345/421 |
| 2013/0135329 | A1* | 5/2013 | Seetharamaiah et al. ..... 345/522 |
| 2014/0146064 | A1* | 5/2014 | Seetharamaiah et al. ..... 345/531 |

OTHER PUBLICATIONS

Antochi et al., "Memory Bandwidth Requirements of title-based rendering", Computer systems: Architectures, Modeling, and Simulation, Third and Fourth International Workshops, SAMOS 2003 and SAMOS 2004, Proceedings—Jul. 21-23, 2003 & Jul. 19-21, 2004— Samos, Greece (In: Lecture Notes in Computer Sciences) vol. 3133, XP009126264, 10 pp.
International Search Report and Written Opinion—PCT/US2013/077278—ISA/EPO—Apr. 11, 2014.
Ribble, "Next-Gen: Tile-Based GPUs", Game developers conference mobile'08, San Francisco, Feb. 18-22, 2008, XP002722660, 36 pp.
Sag, "Qualcomm Snapdragon S4 Benchmarking Day", Bright Side of News, retrieved from http://www.brightsideofnews.com/en/, Jul. 25, 2012, 6 pp.

(Continued)

Primary Examiner — Wesner Sajous
(74) Attorney, Agent, or Firm — Shumaker & Sieffert, P.A.

(57) ABSTRACT

In some examples, aspects of this disclosure relate to a method for rendering an image. For example, the method includes generating visibility information indicating visible primitives of the image. The method also includes rendering the image using a binning configuration, wherein the binning configuration is based on the visibility information.

54 Claims, 8 Drawing Sheets

(56) References Cited

OTHER PUBLICATIONS

Second Written Opinion from corresponding PCT Application Serial No. PCT/US2013/077278, dated Mar. 16, 2015, 7 pp.

Reply to Second Written Opinion dated Mar. 16, 2015, from corresponding PCT Application Serial No. PCT/US2013/077278, filed Apr. 16, 2015, 6 pp.

* cited by examiner

RENDERING GRAPHICS DATA USING VISIBILITY INFORMATION

TECHNICAL FIELD

This disclosure relates to rendering computer graphics.

BACKGROUND

A device that provides content for visual presentation on an electronic display generally includes a graphics processing unit (GPU). The GPU renders pixels that are representative of the content on a display. The GPU generates one or more pixel values for each pixel on the display and performs graphics processing on the pixel values for each pixel on the display to render each pixel for presentation.

SUMMARY

The techniques of this disclosure generally relate to rendering graphics data. For example, the techniques of this disclosure include utilizing visibility information to optimize rendering. According to some aspects, the manner in which rendering is performed, e.g., direct rendering or tile-based rendering, may be dynamically determined using visibility information associated with the primitives being rendered. For example, tile-based rendering may be used to render areas of an image that include occluded primitives to skip rendering of the invisible primitives. In addition, direct rendering may be used to render areas of an image having few or no occluded primitives.

In an example, aspects of this disclosure relate to a method for rendering an image that includes generating visibility information indicating visible primitives of an image, and rendering the image using a binning configuration, wherein the binning configuration is based on the visibility information.

In another example, aspects of this disclosure relate to an apparatus for rendering an image that includes one or more processors configured to generate visibility information indicating visible primitives of an image, and to render the image using a binning configuration, wherein the binning configuration is based on the visibility information.

In another example, aspects of this disclosure relate to an apparatus for rendering an image that includes means for generating visibility information indicating visible primitives of an image, and means for rendering the image using a binning configuration, wherein the binning configuration is based on the visibility information.

In another example, aspects of this disclosure relate to a non-transitory computer-readable storage medium having instructions stored thereon that, when executed, cause one or more processors to generate visibility information indicating visible primitives of an image, and render the image using a binning configuration, wherein the binning configuration is based on the visibility information.

In another example, aspects of this disclosure relate to a method for rendering an image that includes receiving visibility information indicating visible primitives of the image, and determining a binning configuration comprising a distribution of a plurality of primitives to one or more bins based on the visibility information.

In another example, aspects of this disclosure relate to an apparatus for rendering an image that includes one or more processors configured to receive visibility information indicating visible primitives of the image, and determine a binning configuration comprising a distribution of a plurality of primitives to one or more bins based on the visibility information.

In another example, aspects of this disclosure relate to an apparatus for rendering an image that includes means for receiving visibility information indicating visible primitives of the image, and means for determining a binning configuration comprising a distribution of a plurality of primitives to one or more bins based on the visibility information.

In another example, aspects of this disclosure relate to a non-transitory computer-readable storage medium having instructions stored thereon that, when executed, cause one or more processors to receive visibility information indicating visible primitives of the image, and determine a binning configuration comprising a distribution of a plurality of primitives to one or more bins based on the visibility information.

The details of one or more examples of the disclosure are set forth in the accompanying drawings and the description below. Other features, objects, and advantages will be apparent from the description and drawings, and from the claims.

DETAILED DESCRIPTION

Figure 1:
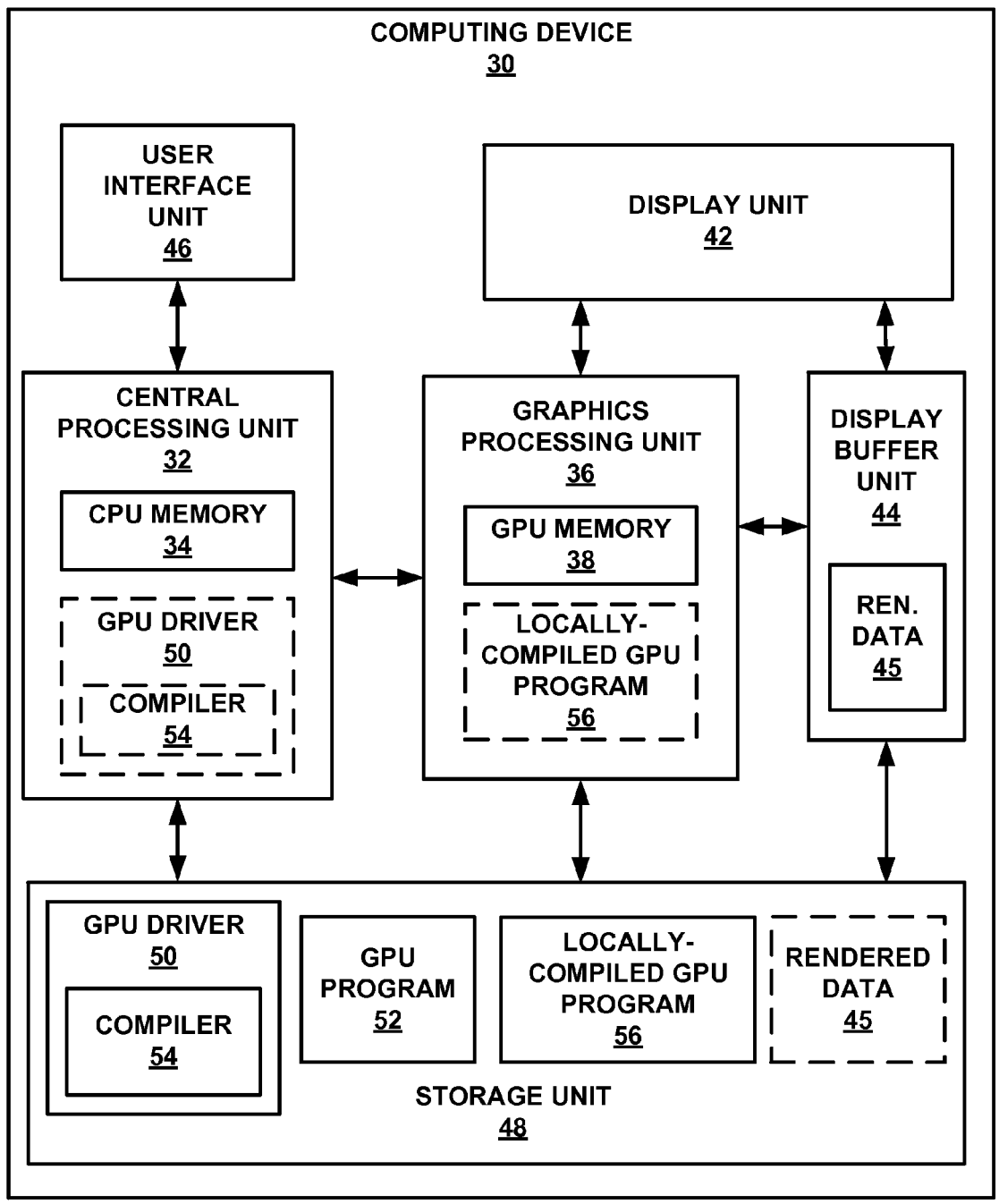
FIG. 1 is a block diagram illustrating a computing device that may be configured to implement aspects of this disclosure.

Traditional graphics processing unit (GPU) architectures may require a relatively large amount of data to be read from and written to system memory when rendering a frame of graphics data (which may be referred to as an image). Mobile architectures may lack the bandwidth capacity required for processing entire frames of data. Accordingly, tile-based architectures have been developed that break an image into multiple tiles. The tiles are sized so that they can be processed using a small amount (e.g., 256 kB) of high bandwidth, on-chip graphics memory. That is, the size of each tile may depend on the amount of available on-chip graphics memory. The image is then reconstructed after processing each tile individually.

Tile-based rendering may be described with respect to a number of processing passes. For example, when performing tile-based rendering a GPU may perform a binning pass and a rendering pass. With respect to the binning pass, the GPU may process an entire frame and sort rasterized primitives (such as triangles) into tile-sized areas called bins. That is, the GPU processes a command stream for an entire image and assigns the rasterized primitives of the image to bins.

In some examples, the GPU generates one or more visibility streams during the binning pass. A visibility stream indicates the primitives that are visible in the final image and the primitives that are invisible in the final image. For example, a primitive may be invisible if it is obscured by one or more other primitives such that the primitive cannot be seen in the shaded, finished image.

A visibility stream may be generated for an entire image, or may be generated on a per-bin basis (e.g., one visibility stream for each bin). In general, a visibility stream may include a series of 1's and 0's, with each "1" or "0" being associated with a particular primitive. Each "1" indicates that the primitive is visible in the final image. Each "0" indicates that the primitive is invisible in the final image. The visibility stream may control the rendering pass (described below). For example, the visibility stream may be used to skip sequences of invisible primitives during rendering. Accordingly, only the primitives that actually contribute to a bin, i.e., that are visible in the final image, are rendered and shaded, thereby reducing shading operations.

Each rendering pass may include a clear/unresolve stage, a rendering stage, and a resolve stage. During the clear/unresolve stage, the GPU may initialize on-chip memory for a new tile to be rendered. For example, the GPU may initialize the on-chip memory to a certain value (clear), or read values from external memory to the on-chip memory (unresolve). During the rendering stage, the GPU may process the tile and store the processed tile to the on-chip memory. That is, the GPU may implement a graphics processing pipeline to determine pixel values and write the pixel values to the on-chip memory. During the resolve stage, the GPU may transfer the finished pixel values of the tile from the on-chip memory to external memory. After finishing all of the tiles of an image, the image is ready to be output (e.g., displayed).

While tile-based rendering with a visibility stream may allow fewer primitives to be processed (by skipping invisible primitives), there is a computational cost associated with rendering an image bin by bin. Each bin may be referred to as a chunk of data. With tile-based rendering, as described above, each chunk is loaded into local, on-chip GPU memory (load), rendered (render), and stored to system memory (store).

In contrast, a GPU may perform direct rendering, which does not use visibility information. When performing direct rendering, the GPU shades and writes each and every primitive directly to system memory, regardless of whether the primitives are visible. That is, invisible primitives may be written to system memory, only to be later written over by other primitive information. Accordingly, direct rendering does not require an entire chunk to be loaded to on-chip memory prior to rendering and transferred from on-chip memory to system memory after rendering.

Accordingly, the process of determining visibility information and performing tile-based rendering (also referred to herein as bin-based rendering) is typically most beneficial in situations in which at least a portion of an image has a relatively large amount of overdraw. Overdraw refers to drawing one primitive over another primitive, such that at least a portion of the overdrawn primitive is not visible. In instances in which there is little overdraw, the extra data transfer between local memory and system memory associated with tile-based rendering may introduce latencies.

However, a driver for the GPU (typically executed by another processing unit, such as a central processing unit (CPU)) may typically be responsible for determining the configuration of the bins. In addition, once generated, the GPU typically cannot alter visibility streams and is locked into rendering the image according to the visibility streams. That is, the GPU must load each chunk, render the chunk, and store the chunk to memory. Accordingly, the GPU generally may not choose between tile-based rendering and directed rendering based on the image being rendered. That is, for example, the GPU is not typically capable of dynamically selecting tile-based rendering for areas having a relatively large amount of overdraw and direct rendering for areas having a relatively small amount of overdraw. Rather, as noted above, the GPU is generally locked into performing either tile-based rendering or direct rendering for an entire image.

The techniques of this disclosure generally relate to utilizing visibility information to optimize rendering. For example, according to aspects of this disclosure, the manner in which rendering is performed, e.g., direct rendering or tile-based rendering, may be dynamically determined based on visibility information. In some instances, visibility information may include data describing which primitives are visible, as well as data describing a complexity of the image. For example, visibility information may include a visibility stream, as well as heuristic data associated with the visibility stream. The heuristic data may include, for example, a number of primitives in a bin, a number of visible primitives in a bin, the number of invisible primitives in a bin, a size of the primitives, and the like. In some instances, a score may be assigned to a bin based on the visibility information indicating an overall complexity of a bin, an amount of overdraw for a bin, and the like.

Based on this visibility information, a determination may be made whether to directly render a bin or render the bin using a visibility stream (tile-based rendering). That is, for example, assume an initial binning configuration is determined for an image, and all of the bins are initially set to be rendered using tile-based rendering. In this example, bins that were initially set to be tile-based rendered having a relatively small amount of overdraw may be switched to direct rendering. Additionally or alternatively, a new binning configuration may be determined and implemented. For example, the manner in which primitives are distributed to bins for tile-based rendering may be altered based on visibility information.

Accordingly, according to aspects of this disclosure, tile-based rendering with visibility streams may be used to render portions of an image that may benefit from the visibility information (e.g., relatively complex areas having numerous primitives and/or a large amount of overdraw). In addition, direct rendering may be used to render portions of an image in which tile-based rendering would result in latencies associated with the transfer of data from local, on-chip memory to system memory. Implementing such techniques may increase the efficiency with which an image is rendered.

As described in greater detail below, a binning configuration may be determined by a GPU, a GPU driver (e.g., as executed by a central processing unit (CPU)), or a combination thereof. That is, in one example, a GPU driver may generate an initial binning configuration. The GPU may process the initial binning configuration and generate visibility information based on the initial binning configuration. The GPU may send the visibility information to the GPU driver, which may generate a revised binning configuration based on the visibility information. In another example, rather than sending the visibility information to the GPU driver, the GPU may determine a revised binning configuration based on the visibility information. In still another example, the GPU driver and the GPU may share the responsibility of determining a revised binning configuration based on the visibility information.

FIG. 1 is a block diagram illustrating a computing device 30 that may implement the techniques of this disclosure for rendering graphics data. Examples of computing device 30 include, but are not limited to, wireless devices, mobile or cellular telephones, including so-called smartphones, personal digital assistants (PDAs), video gaming consoles that include video displays, mobile video gaming devices, mobile video conferencing units, laptop computers, desktop computers, television set-top boxes, tablet computing devices, e-book readers, fixed or mobile media players, and the like.

In the example of FIG. 1, computing device 30 includes a central processing unit (CPU) 32 having CPU memory 34, a graphics processing unit (GPU) 36 having GPU memory 38 and one or more shading units 40, a display unit 42, a display buffer unit 44 storing rendered data 45 ("ren. data"), a user interface unit 46, and a data storage unit 48. In addition, storage unit 48 may store GPU driver 50 having compiler 54, GPU program 52, and locally-compiled GPU program 56.

Examples of CPU 32 include, but are not limited to, a digital signal processor (DSP), general purpose microprocessor, application specific integrated circuit (ASIC), field programmable logic array (FPGA), or other equivalent integrated or discrete logic circuitry. Although CPU 32 and GPU 36 are illustrated as separate units in the example of FIG. 1, in some examples, CPU 32 and GPU 36 may be integrated into a single unit. CPU 32 may execute one or more applications. Examples of the applications may include web browsers, e-mail applications, spreadsheets, video games, audio and/or video capture, playback or editing applications, or other applications that initiate the generation for image data to be presented via display unit 42.

In the example shown in FIG. 1, CPU 32 includes CPU memory 34. CPU memory 34 may represent on-chip storage or memory used in executing machine or object code. CPU memory 34 may each comprise a hardware memory register capable of storing a fixed number of digital bits. CPU 32 may be able to read values from or write values to local CPU memory 34 more quickly than reading values from or writing values to storage unit 48, which may be accessed, e.g., over a system bus.

GPU 36 represents one or more dedicated processors for performing graphical operations. That is, for example, GPU 36 may be a dedicated hardware unit having fixed function and programmable components for rendering graphics and executing GPU applications. GPU 36 may also include a DSP, a general purpose microprocessor, an ASIC, an FPGA, or other equivalent integrated or discrete logic circuitry.

GPU 36 also includes GPU memory 38, which may represent on-chip storage or memory used in executing machine or object code. GPU memory 38 may each comprise a hardware memory register capable of storing a fixed number of digital bits. GPU 36 may be able to read values from or write values to local GPU memory 38 more quickly than reading values from or writing values to storage unit 48, which may be accessed, e.g., over a system bus.

Display unit 42 represents a unit capable of displaying video data, images, text or any other type of data for consumption by a viewer. Display unit 42 may include a liquid-crystal display (LCD), a light emitting diode (LED) display, an organic LED (OLED), an active-matrix OLED (AMOLED) display, or the like.

Display buffer unit 44 represents a memory or storage device dedicated to storing data for presentation of imagery, such as computer generated graphics, still images, video frames, or the like (rendered data 45) for display unit 42. Display buffer unit 44 may represent a two-dimensional buffer that includes a plurality of storage locations. The number of storage locations within display buffer unit 44 may be substantially similar to the number of pixels to be displayed on display unit 42. For example, if display unit 42 is configured to include 640×480 pixels, display buffer unit 44 may include 640×480 storage locations storing pixel color and intensity information, such as red, green and blue pixel values, or other color values.

Display buffer unit 44 may store the final pixel values for each of the pixels processed by GPU 36. Display unit 42 may retrieve the final pixel values from display buffer unit 44, and display the final image based on the pixel values stored in display buffer unit 44.

User interface unit 46 represents a unit with which a user may interact with or otherwise interface to communicate with other units of computing device 30, such as CPU 32. Examples of user interface unit 46 include, but are not limited to, a trackball, a mouse, a keyboard, and other types of input devices. User interface unit 46 may also be, or include, a touch screen and the touch screen may be incorporated as a part of display unit 42.

Storage unit 48 may comprise one or more computer-readable storage media. Examples of storage unit 48 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a computer or a processor.

In some example implementations, storage unit 48 may include instructions that cause CPU 32 and/or GPU 36 to perform the functions ascribed to CPU 32 and GPU 36 in this disclosure. Storage unit 48 may, in some examples, be considered as a non-transitory storage medium. The term "non-transitory" may indicate that the storage medium is not embodied in a carrier wave or a propagated signal. However, the term "non-transitory" should not be interpreted to mean that storage unit 48 is non-movable. As one example, storage unit 48 may be removed from computing device 30, and moved to another device. As another example, a storage unit, substantially similar to storage unit 48, may be inserted into computing device 30. In certain examples, a non-transitory storage medium may store data that can, over time, change (e.g., in RAM).

Storage unit 48 stores a GPU driver 50 and compiler 54, GPU program 52, and locally-compiled GPU program 56. GPU driver 50 represents a computer program or executable code that provides an interface to access GPU 36. CPU 32 executes GPU driver 50 or portions thereof to interface with GPU 36 and, for this reason, GPU driver 50 is shown in the example of FIG. 1 as a dash-lined box labeled "GPU driver 50" within CPU 32. GPU driver 50 is accessible to programs or other executables executed by CPU 32, including GPU program 52.

GPU program 52 may include code written in a high level (HL) programming language, e.g., using an application programming interface (API). Examples of APIs include Open-Computing Language ("OpenCL"), Open Graphics Library ("OpenGL"), and DirectX, as developed by Microsoft, Inc. In general, an API includes a predetermined, standardized set of commands that are executed by associated hardware. API commands allow a user to instruct hardware components of a GPU to execute commands without user knowledge as to the specifics of the hardware components.

GPU program 52 may invoke or otherwise include one or more functions provided by GPU driver 50. CPU 32 generally executes the program in which GPU program 52 is embedded and, upon encountering GPU program 52, passes GPU program 52 to GPU driver 50. CPU 32 executes GPU driver 50 in this context to process GPU program 52. That is, for example, GPU driver 50 may process GPU program 52 by compiling GPU program 52 into object or machine code executable by GPU 36. This object code is shown in the example of FIG. 1 as locally compiled GPU program 56.

In some examples, compiler 54 may operate in real-time or near-real-time to compile GPU program 52 during the execution of the program in which GPU program 52 is embedded. For example, compiler 54 generally represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, e.g., CPU 32 and GPU 36).

In the example of FIG. 1, compiler 54 may receive GPU program 52 from CPU 32 when executing HL code that includes GPU program 52. Compiler 54 may compile GPU program 52 to generate locally-compiled GPU program 56 that conforms to a LL programming language. Compiler 54 then outputs locally-compiled GPU program 56 that includes the LL instructions.

GPU 36 generally receives locally-compiled GPU program 56 (as shown by the dashed lined box labeled "locally-compiled GPU program 56" within GPU 36), whereupon, in some instances, GPU 36 renders one or more images and outputs the rendered images to display buffer unit 44. For example, GPU 36 may generate a number of primitives to be displayed at display unit 42. Primitives may include one or more of a line (including curves, splines, etc.), a point, a circle, an ellipse, a polygon (where typically a polygon is defined as a collection of one or more primitives) or any other two-dimensional (2D) primitive. The term "primitive" may also refer to three-dimensional (3D) primitives, such as cubes, cylinders, sphere, cone, pyramid, torus, or the like. Generally, the term "primitive" refers to any basic geometric shape or element capable of being rendered by GPU 36 for display as an image (or frame in the context of video data) via display unit 42.

GPU 36 may transform primitives and other attributes (e.g., that defines a color, texture, lighting, camera configuration, or other aspect) of the primitives into a so-called "world space" by applying one or more model transforms (which may also be specified in the state data). Once transformed, GPU 36 may apply a view transform for the active camera (which again may also be specified in the state data defining the camera) to transform the coordinates of the primitives and lights into the camera or eye space. GPU 36 may also perform vertex shading to render the appearance of the primitives in view of any active lights. GPU 36 may perform vertex shading in one or more of the above model, world or view space (although it is commonly performed in the world space).

Once the primitives are shaded, GPU 36 may perform projections to project the image into a unit cube with extreme points, as one example, at (−1, −1, −1) and (1, 1, 1). This unit cube is commonly referred to as a canonical view volume. After transforming the model from the eye space to the canonical view volume, GPU 36 may perform clipping to remove any primitives that do not at least partially reside within the view volume. In other words, GPU 36 may remove any primitives that are not within the frame of the camera. GPU 36 may then map the coordinates of the primitives from the view volume to the screen space, effectively reducing the 3D coordinates of the primitives to the 2D coordinates of the screen.

Given the transformed and projected vertices defining the primitives with their associated shading data, GPU 36 may then rasterize the primitives. During rasterization, GPU 36 may apply any textures associated with the primitives (where textures may comprise state data). GPU 36 may also perform a Z-buffer algorithm, also referred to as a depth test, during rasterization to determine whether any of the primitives and/or objects are occluded by any other objects. The Z-buffer algorithm sorts primitives according to their depth so that GPU 36 knows the order in which to draw each primitive to the screen. When binning (e.g., for tile-based rendering) shading may not be performed during rasterization. When rendering the primitives, however, GPU 36 may compute and set colors for the pixels of the screen covered by the primitives. GPU 36 then outputs rendered pixels to display buffer unit 44.

Display buffer unit 44 may temporarily store the rendered pixels of the rendered image until the entire image is rendered. Display buffer unit 44 may be considered as an image frame buffer in this context. Display buffer unit 44 may transmit the rendered image to be displayed on display unit 42. While shown and described separately, in some instances, display buffer unit 44 may form a portion of storage unit 48.

In some examples, GPU 36 may implement tile-based rendering to render an image. For example, GPU 36 may implement a tile-based architectures that renders an image by breaking the image into multiple portions, referred to as tiles. The tiles may be sized based on the size of GPU memory 38. For example, GPU 36 may render a tile to GPU memory 38. Upon completion of the tile, GPU 36 may transfer the tile from GPU memory 38 to storage unit 48 and/or display buffer unit 44 (as rendered data 45). After GPU 36 has rendered all of the tiles associated with a frame in this way, display buffer unit 44 may output the finished image to display unit 42. Rendering images using multiple tiles may reduce the amount and/or frequency of data transfer between GPU memory 38 and storage unit 48.

When performing tile-based rendering, GPU driver 50 may initially determine a binning configuration for rendering an image. For example, GPU driver 50 may determine a bin size based on the size of GPU memory 38. In addition, GPU driver 50 may apply a predetermined bin layout. For example, GPU driver 50 may set an initial bin in the upper left corner of an image. GPU driver 50 may add bins from left to right and top to bottom of the image until the entire image has been divided into bins.

GPU driver 50 also generates a command stream using GPU program 52. For example, the command stream may contain instructions for rendering images from GPU program 52. GPU driver 50 may add instructions to the command stream, which are executed by GPU 36 in the order in which they appear in the stream. The command steam may define the primitives that make up images from GPU program 52.

After the initial binning configuration and command stream has been set by GPU driver 50, GPU 36 may perform a binning pass and a rendering pass. With respect to the binning pass, GPU 36 may process an entire frame and sort rasterized primitives into the bins of the initial binning configuration (set by GPU driver 50). GPU 36 may also generate a visibility stream during the binning pass, which may be separated according to bin. For example, each bin may be assigned a corresponding portion of the visibility stream for the image.

GPU driver 50 may access the visibility stream and generate command streams for rendering each bin. Accordingly, the command streams may be set according to the initial binning configuration. That is, the command streams may be generated and ordered so that GPU 36 renders tiles of an image in the order of the initial binning configuration.

When rendering a tile, GPU 36 may perform a clear/unresolve stage, a rendering stage, and a resolve stage. During the clear/unresolve stage, GPU 36 initializes GPU memory 38 for a new tile to be rendered. During the rendering stage, GPU 36 may render the tile and store the rendered tile to GPU memory 38. That is, GPU 36 may determine pixel values for each pixel of the tile and write the pixel values to GPU memory 38. During the resolve stage, GPU 36 may transfer the finished pixel values of the tile from GPU memory 38 to display buffer unit 44 (or storage unit 48).

While tile-based rendering with a visibility stream may allow fewer primitives to be processed (by skipping primitives that are not visible) there is a computational cost associated with loading and storing data to GPU memory 38, and transferring an entire tile from GPU memory 38 to display buffer unit 44. For example, in contrast to tile-based rendering, GPU 36 may directly render data by storing pixel values to display buffer unit 44 (or storage unit 48) following rendering, rather than storing the pixel values to GPU memory 38. With direct rendering, GPU driver 50 does not use a visibility stream to identify and skip primitives that are not visible in the final image. Rather, the command stream includes instructions to render all primitives, regardless of whether the primitives are visible. Accordingly, invisible primitives in storage unit 48 and/or display buffer unit 44 may eventually be written over by pixel values associated with one or more other primitives.

The process of determining visibility information and performing tile-based rendering (also referred to herein as bin-based rendering) is typically most beneficial in situations in which at least a portion of an image has a relatively large amount of overdraw. Overdraw refers to drawing one primitive over another primitive, such that at least a portion of the overdrawn primitive is not visible. In instances in which there is little overdraw, the extra data transfer between local memory and system memory associated with tile-based rendering may introduce latencies.

However, as noted above, GPU driver 50 determines the initial configuration of the bins. In addition, GPU 36 sorts visible primitives to bins to create the visibility streams based on the initial configuration of the bins. Accordingly, once the visibility streams are generated based on the initial configuration of the bins, GPU driver 50 cannot alter the command streams for rendering the primitives. That is, for example, GPU driver 50 is typically not capable of generating a command stream for directly rendering areas that do not have a large amount of overdraw, while also generating a tile-based rendering command stream for areas that have a relatively large amount of overdraw. Rather, GPU driver 50 and GPU 36 are typically locked into performing either tile-based rendering or direct rendering for an entire image.

The techniques of this disclosure generally relate to utilizing visibility information to optimize rendering. For example, according to aspects of this disclosure, GPU 36 and GPU driver 50 may dynamically determine how to render a particular image based on visibility information associated with the image. In this way, GPU 36 and GPU driver 50 may perform direct rendering (without using a visibility stream and storing data directly to display buffer unit 44) in some areas of an image, while performing tile-based rendering (using a visibility stream and storing data to GPU memory 38) in other areas of the same image.

Accordingly, according to aspects of this disclosure, GPU 36 may use tile-based rendering to render portions of an image that may benefit from the visibility information (e.g., relatively complex areas having numerous primitives and/or a large amount of overdraw). In addition, GPU 36 may use direct rendering to render portions of an image in which tile-based rendering would result in latencies associated with the transfer of data from local, on-chip memory to system memory. Implementing such techniques may increase the efficiency with which an image is rendered.

It should be understood that computing device 30 is provided as merely an example, and other computing devices 30 performing the techniques of this disclosure may be arranged differently. For example, while display buffer unit 44 is shown and described separately from storage unit 48, in other examples display unit buffer 44 and storage unit 48 may be incorporated into the same component.

Moreover, it should be understood that computing device 30 may include additional modules or units not shown in FIG. 1 for purposes of clarity. For example, computing device 30 may include a transceiver unit for transmitting and receiving data, and may include circuitry to allow wireless or wired communication between computing device 30 and another device or a network. Computing device 30 may also include a speaker and a microphone, neither of which are shown in FIG. 1, to effectuate telephonic communications in examples where computing device 30 is a mobile wireless telephone, such as a smartphone, or a speaker and/or a microphone where computing device 30 is a media player or tablet computer. In some instances, user interface unit 46 and display unit 42 may be external to computing device 30 in examples where computing device 30 is a desktop computer or other device that is equipped to interface with an external user interface or display.

Figure 2:
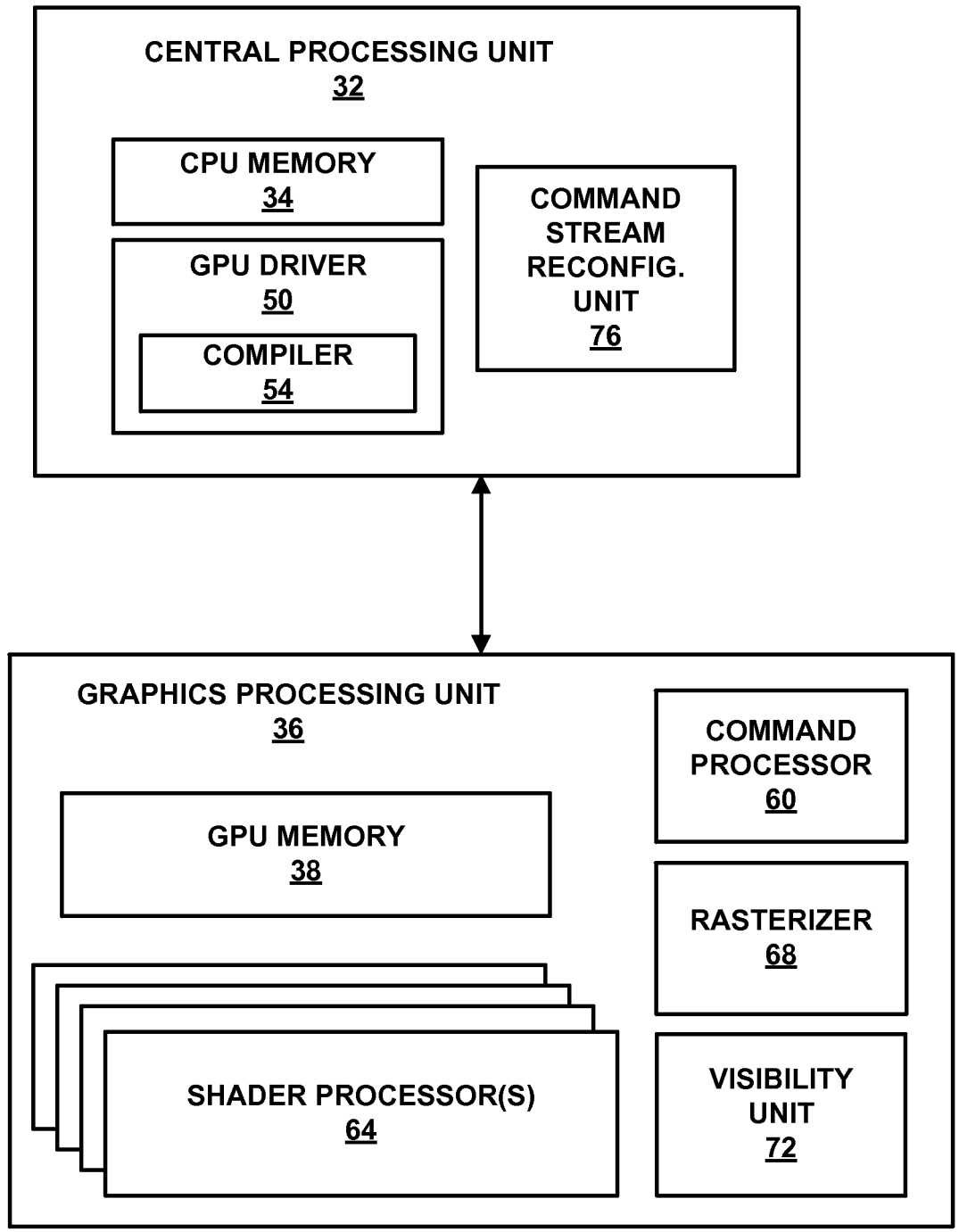
FIG. 2 is a block diagram illustrating another computing device that may be configured to implement aspects of this disclosure.

FIG. 2 is a block diagram illustrating portions of computing device 30 in greater detail. In the example of FIG. 2, GPU 36 includes GPU memory 38, command processor 60, one or more shader processors 64, a rasterizer 68, and a visibility unit 72. In addition, CPU 32 includes CPU memory 34, GPU driver 50, compiler 54, and command stream reconfiguration unit 76. It should be understood that certain units of FIG. 2 may be highly integrated, but are illustrated separately for conceptual purposes. Moreover, some units may be described with respect to a single unit for conceptual purposes, but may include one or more functional units.

FIG. 2 is provided as merely one example of a GPU that can utilize the techniques of this disclosure for rendering graphics data. In other examples, the techniques for rendering graphics data may be carried out by a variety of other GPUs having other components. For example, GPU 36 may also include a variety of other components and units related to analyzing and rendering images, such as an input assembly unit, texture units, scheduling units, arithmetic logic units (ALUs), or other fixed function or programmable GPU components.

Components of GPU 36 may access GPU memory 38 with relatively lower latency than accessing an external memory, such as storage unit 48 (FIG. 1). For example, GPU memory 38 may be an on-chip memory that is on-chip with GPU 36 and in relatively close proximity with GPU components, and may be associated with a dedicated memory bus within GPU 36. To access data stored in storage unit 48, in contrast, GPU 36 may have to share a memory bus with other components of computing device 30 (such as CPU 32), which may result in a more limited available bandwidth.

To take advantage of the high bandwidth, low latency GPU memory 38, as described above, GPU 36 may render graphics using a tile-based rendering architecture. GPU 36 may break an image (which may also be referred to as a scene) into smaller portions (e.g., tiles). GPU memory 38 may store data associated with a tile while GPU 36 renders the tile. After rendering the tile, GPU 36 may resolve, or copy, the rendered pixel data from GPU memory 38 to storage unit 48 via a memory bus.

Command processor 60 may be responsible for reading a command stream from GPU driver 50. For example, as described above with respect to FIG. 1, GPU driver 50 may issue instructions for execution by GPU 36, which may be referred to as a command stream. Command processor 60 may read and/or decode the instructions of the command stream. In some examples, command processor 60 may read from a buffer containing the instructions of the command stream. Command processor 60 may also initiate execution of the instructions at GPU 36. For example, command processor 60 may feed instructions to a thread scheduler that schedules the instructions to be executed by shader processors 64.

Shader processors 64 may be responsible for executing instructions. For example, shader processors 64 may be programmable shading units responsible for vertex, geometry, and pixel shading operations. For example, one or more of shader processors 64 may be responsible for determining vertex positions of primitives (e.g., triangles) that make up a scene to produce a triangle mesh of the scene. In addition, one or more of shader processors 64 may be responsible for generating primitives from the triangle mesh, as well as pixel filling and shading operations.

Shader processors 64 may be configured identically, or may be individually configured to perform a specific task. For example, one of shader processors 64 may be designated as a "binning shader" that is responsible for binning operations, while the remaining shader processors 64 may be responsible for performing the vertex, geometry, or pixel shading operations described above.

Rasterizer 68 may receive vertex information and may generate a representation of primitives of a scene. In some examples, rasterizer 68 applies predefined rules to received vertex information to determine which primitives are visible in the final scene. Rasterizer 68 may cull, or remove, any invisible primitives of the scene. For example, rasterizer 68 may perform z-buffering to identify primitives that are covered by other primitives, and therefore not visible in the final scene.

Visibility unit 72 may include any combination of fixed function hardware components and/or programmable processing units. Visibility unit 72 may receive the rasterized data from rasterizer 68 and generate one or more visibility streams. To generate the visibility stream, visibility unit 72 may distribute each of the visible primitives, as determined by rasterizer 68, to bins. Each bin may represent a tile of the finished scene.

In some examples, visibility unit 72 may generate a separate visibility stream for each of the bins. For example, visibility unit 72 may generate a visibility stream for a particular bin by setting flags to indicate which primitives of the particular bin are visible and which primitives of the particular are invisible. According to some aspects, visibility unit 72 may set a flag value of "1" to indicate that a primitive is visible in the final scene and a flag value of "0" to indicate that a primitive is not visible in the final scene.

Accordingly, visibility unit 72 may generate a plurality of visibility streams comprising flags that indicate the visible primitives of each of the bins. In some examples, visibility unit 72 may compress the visibility streams. For example, visibility unit 72 may apply a compression scheme to reduce large strings of "0" flags and reduce the amount of memory required to restore the visibility streams.

According to aspects of this disclosure, visibility unit 72 may also generate heuristic data for each bin of a scene. In general, the heuristic data describes characteristics of a bin. For example, visibility unit 72 may generate on a per-visibility stream basis to describe visibility characteristics of the bin. In some examples, the heuristic data may include data describing the number of primitives in a bin, a number of visible primitives in a bin, a number of invisible or occluded primitives in a bin, a size of the primitives in a bin, and the like.

In some instances, according to aspects of this disclosure, visibility unit 72 may assign a score to each bin based on the visibility stream and/or heuristic data. For example, visibility unit 72 may assign a score to each bin indicating an overall complexity of each bin, an amount of overdraw for each bin, and the like. In an example for purposes of illustration, visibility unit 72 may numerically rank each bin according to an amount of overdraw for each bin, where a 0 ranking indicates that there are no overlapping primitives in a bin and a 10 ranking indicates that there are numerous overlapping primitives.

In some examples, the one or more visibility streams, the heuristic data, and the visibility score may all generally be referred to as visibility information. That is, visibility information may include any subset of visibility streams, heuristic data, and visibility scores.

According to aspects of this disclosure, visibility unit 72 may prepare the visibility information to be sent to GPU driver 50. For example, visibility unit 72 may, in some instances, append the heuristic data and/or visibility scores to the end of the visibility streams. In other examples, visibility unit 72 may provide the heuristic data and/or visibility scores separately from the visibility streams.

In any case, in the example shown in FIG. 2, the visibility information may be received by command stream reconfiguration unit 76. While shown separately from GPU driver 50 for purposes of explanation, it should be understood that command stream reconfiguration unit 76 may be integrated with GPU driver 50, such that GPU driver 50 carries out the techniques ascribed in this disclosure to command stream reconfiguration unit 76.

Command stream reconfiguration unit 76 may receive visibility information from visibility unit 72. As described in greater detail below, command stream reconfiguration unit 76 may reconfigure a command stream based on the visibility information. For example, command stream reconfiguration unit 76 may designate some bins originally set to be tile-based rendered to be directly rendered. In another example, command stream reconfiguration unit 76 may change the binning configuration to form new bins. That is, command stream reconfiguration unit 76 may merge one or more (or portions of one or more) visibility streams to create new bins.

In an example for purposes of illustration, GPU driver 50 may generate a command stream defining an image for rendering in accordance with a program executed at CPU 32. The command stream may indicate an initial binning configuration. For example, GPU driver 50 may determine a bin size based on the size of GPU memory 38. In addition, GPU driver 50 may use a predetermined bin arrangement (relative positions of the bins) to break the image into the appropriate number of bins.

The command stream may be received by command processor 60 of GPU 36. GPU 36 may perform a binning pass (as described above with respect to FIG. 1) and generate one or more visibility streams for primitives of the image. That is, for example, visibility unit 72 may generate one or more visibility streams indicating which primitives of the image are visible in the initial binning configuration.

In addition, according to aspects of this disclosure, visibility unit 72 may generate heuristic data and/or visibility scores for the visibility streams. For example, as described above, visibility unit 72 may determine the number of primitives in each of the bins, the number of visible primitives in each of the bins, the number of invisible primitives in each of the bins, the size of the primitives, and the like, and visibility unit 72 may assign a visibility score to the bins based on the visibility information.

In some examples, visibility unit 72 may append the heuristic data and/or scores to the end of the visibility streams. In other examples, visibility unit 72 may provide the heuristic data and/or scores separately from the visibility streams. In any case, visibility unit 72 may send the visibility information (e.g., visibility streams, heuristic data, and/or scores) to command stream reconfiguration unit 76 at CPU 32.

According to aspects of this disclosure, command stream reconfiguration unit 76 may receive the visibility streams, as well as the additional data describing the visibility streams (e.g., heuristic data and/or visibility scores, which may be referred to as decoded visibility information). Command stream reconfiguration unit 76 may use the received data to reconfigure the command stream based on the visibility information. That is, command stream reconfiguration unit 76 determines a command stream for rendering the image based on the visibility information.

In some examples, command stream reconfiguration unit 76 may drop one or more bins from the tile-based rendering passes. That is, command stream reconfiguration unit 76 may designate one or more bins from the initial binning configuration to be directly rendered, rather than tile-based rendered. In another example, command stream reconfiguration unit 76 may determine a revised distribution of primitives to one or more bins for rendering. That is, command stream reconfiguration unit 76 may dynamically generate a new, modified binning configuration for tile-based rendering passes based on the visibility information.

In some examples, command stream reconfiguration unit 76 may merge one or more of the generated visibility streams to create a new binning arrangement. That is, command stream reconfiguration unit 76 may alter the binning configuration by altering the boundaries of one or more bins to encompass an alternative set of primitives. In such examples, bins may no longer be evenly distributed; rather, bins may be arranged based on the complexity of the image. For example, bins may be used to encompass relatively complex areas of an image having overdraw, while other portions of the image may be directly rendered.

According to some examples, command stream reconfiguration unit 76 may use the heuristic data to merge visibility streams until a predetermined complexity metric is attained. For example, command stream reconfiguration unit 76 may merge portions of the initial configuration of bins (using the visibility streams) based on a restricted region growing algorithm. In this way, command stream reconfiguration unit 76 may group the most complex areas of an image (which may benefit most from tile-based rendering) together. In addition, command stream reconfiguration unit 76 may mix and match direct and tile-based rendering according to regions of interest within an image. Such an approach allows GPU 36 to achieve a well balanced rendering load for each pass, while simultaneously eliminating empty batches.

Certain techniques above have been described as being performed by particular components of computing device 30. It should be understood, however, that such examples are provided merely for purposes of explanation. Accordingly, techniques ascribed to one component of computing system 30 may be performed by one or more other components. For example, while visibility unit 72 is described as generating heuristic data and visibility scores from visibility streams, such functions may, in some instances, be carried out by CPU 32, such as by command stream reconfiguration unit 76 or GPU driver 50.

In another example, while described with respect to a separate unit, it should be understood that command stream reconfiguration unit 76 may be highly integrated with other components of CPU 32 and/or GPU 36. For example, command stream reconfiguration unit 76 may be integrated with GPU driver 50, such that CPU 32 (via GPU driver 50) is responsible for reconfiguring a command stream based on visibility information. In this example, CPU 32 may be responsible for generating the initial command stream as well as the reconfigured command stream. The reconfigured command stream may drop one or more bins from tile-based rendering passes associated with the initial command stream, or may include a new binning arrangement that includes new, different bins and/or designated areas for direct rendering.

In other examples, command stream reconfiguration module 76 may be integrated with GPU 36, such that GPU is responsible for reconfiguring a command stream based on visibility information. In such examples, visibility information may be generated and utilized wholly by GPU 36. That is, while CPU 32 (via GPU driver 50) may be responsible for generating an initial command stream, GPU 36 may be responsible for reconfiguring the initial command stream. As noted above, the reconfigured command stream may drop one or more bins from tile-based rendering passes associated with the initial command stream, or may include a new binning arrangement that includes new, different bins and/or designated areas for direct rendering.

Figure 3:
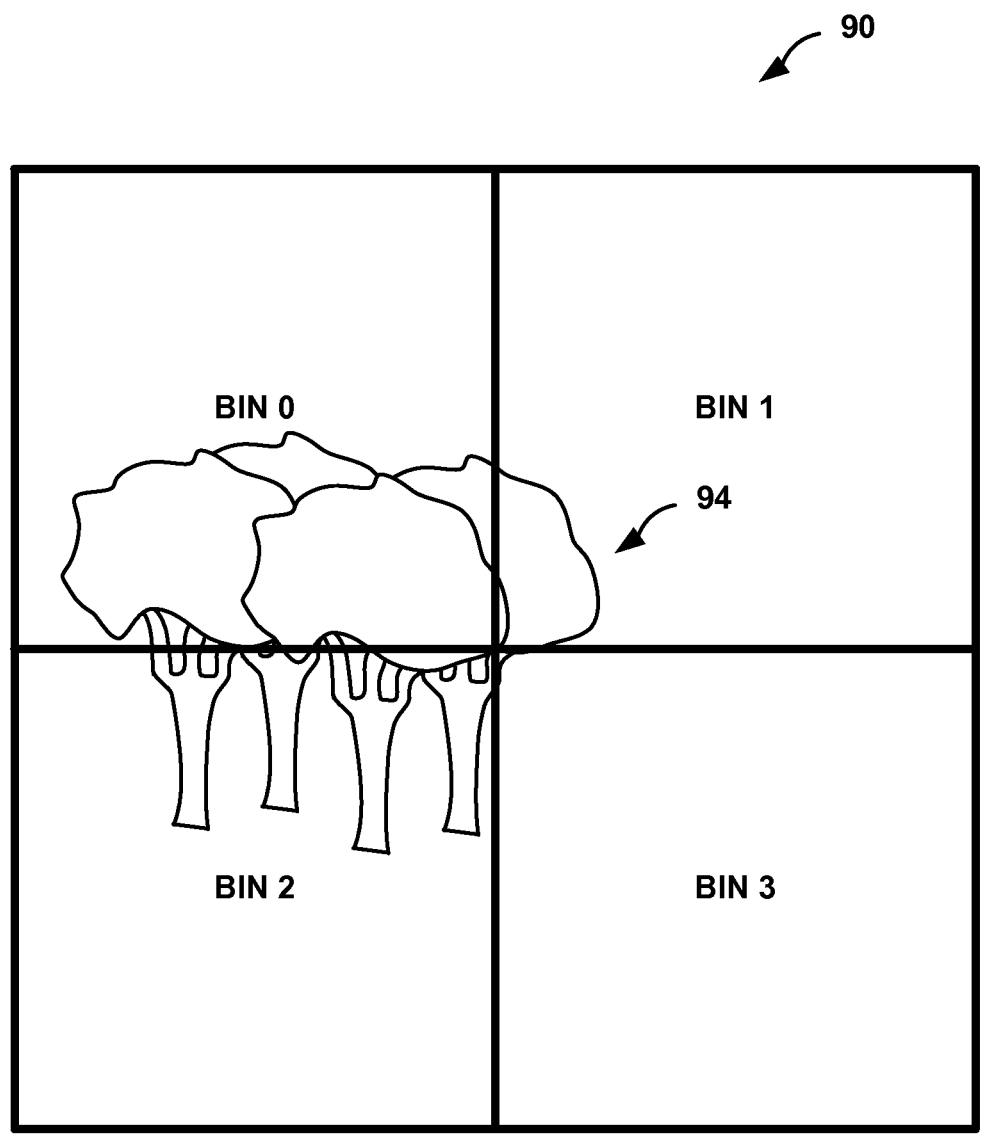
FIG. 3 is a diagram illustrating an image.

FIG. 3 is a diagram illustrating an image 90 having objects 94 for rendering (shown in the example of FIG. 3 as trees). In some examples, image 90 may be rendered by computing device 30, as shown and described above with respect to FIGS. 1 and 2.

For example, GPU driver 50 may generate a command stream defining image 90 for rendering by GPU 36. The command stream may include instructions for rendering primitives of objects 94, as well as an initial binning configuration containing bin 0-bin 3. In some examples, as noted above, GPU driver 50 may determine the size of bins 0-3 based on a size of GPU memory 38. For example, GPU driver 50 may size bins 0-3 such that data associated with each of the bins may be stored at GPU memory 38. In addition, GPU driver 50 may use a predetermined bin arrangement to break image 90 into bins 0-3. That is, in the example FIG. 3, GPU driver 50 may arrange the bins from left to right and top to bottom of image 90. Accordingly, GPU 36 may render image from left to right and top to bottom, initially rendering bin 0, followed by bin 1, bin 2, and bin 3. GPU driver 50 may be preconfigured to determine the initial binning configuration.

As noted above, there is a tradeoff between direct rendering and tile-based rendering. Tile-based rendering with visibility information may allow some occluded primitives to be skipped, reducing the load of shader processors 64. However, there is a cost associated with loading an entire bin of data to local GPU memory 38 (load), and transferring a finished tile from local GPU memory 38 to storage unit 48 (resolve). In contrast, direct rendering eliminates these load and resolve costs by shading and writing all primitives directly to storage unit 48. However, some primitives may be written to storage unit 48 only to be written over by one or more other primitives, causing unnecessary shading to be carried out by shader processors 64.

Accordingly, the process of determining visibility information and performing tile-based rendering is typically most beneficial in situations in which at least a portion of an image has a relatively large amount of overdraw. That is, the ability to skip invisible primitives and reduce the shading load may outweigh latencies associated with the load and resolve stages of tile-based rendering in areas of an image exhibiting a relatively large amount of overdraw. Conversely, in instances in which there is a small amount of overdraw, the ability to directly store data to storage unit 48 (direct rendering) may outweigh the latencies associated with the load and resolve stages of tile-based rendering.

As shown in FIG. 3, most of objects 94 are positioned toward the left side of image 90. In addition, only certain portions of objects 94 are subject to overdraw. For example, only the top portions of objects 94 (e.g., the tops of the trees) in bin 0 are subject to overdraw. The remaining portions of image 90 are not subject to a significant amount of overdraw.

By implementing tile-based rendering for rendering bins 0-3 (with a visibility stream) GPU 36 may render fewer primitives than would be required for direct rendering. That is, in the areas of bin 0 having overdraw, GPU 36 may use visibility streams to skip primitives associated with the occluded portions of objects 94. However, the portions of objects 94 associated with bins 1-3 have little or no overdraw.

In general, GPU driver 50 cannot alter visibility streams generated by GPU 36 and is locked into generating a command stream to render image 90 according to the initial binning configuration. That is, despite bins 1-3 having little or no overdraw, GPU driver 50 may not switch from tile-based rendering to direct rendering on the fly. Moreover, GPU driver 50 may not change the arrangement of the bins.

The techniques of this disclosure generally relate to utilizing visibility information to optimize rendering. For example, as described below with respect to FIGS. 4 and 5, the manner in which to render image 90 may be dynamically determined based on visibility information.

Figure 4:
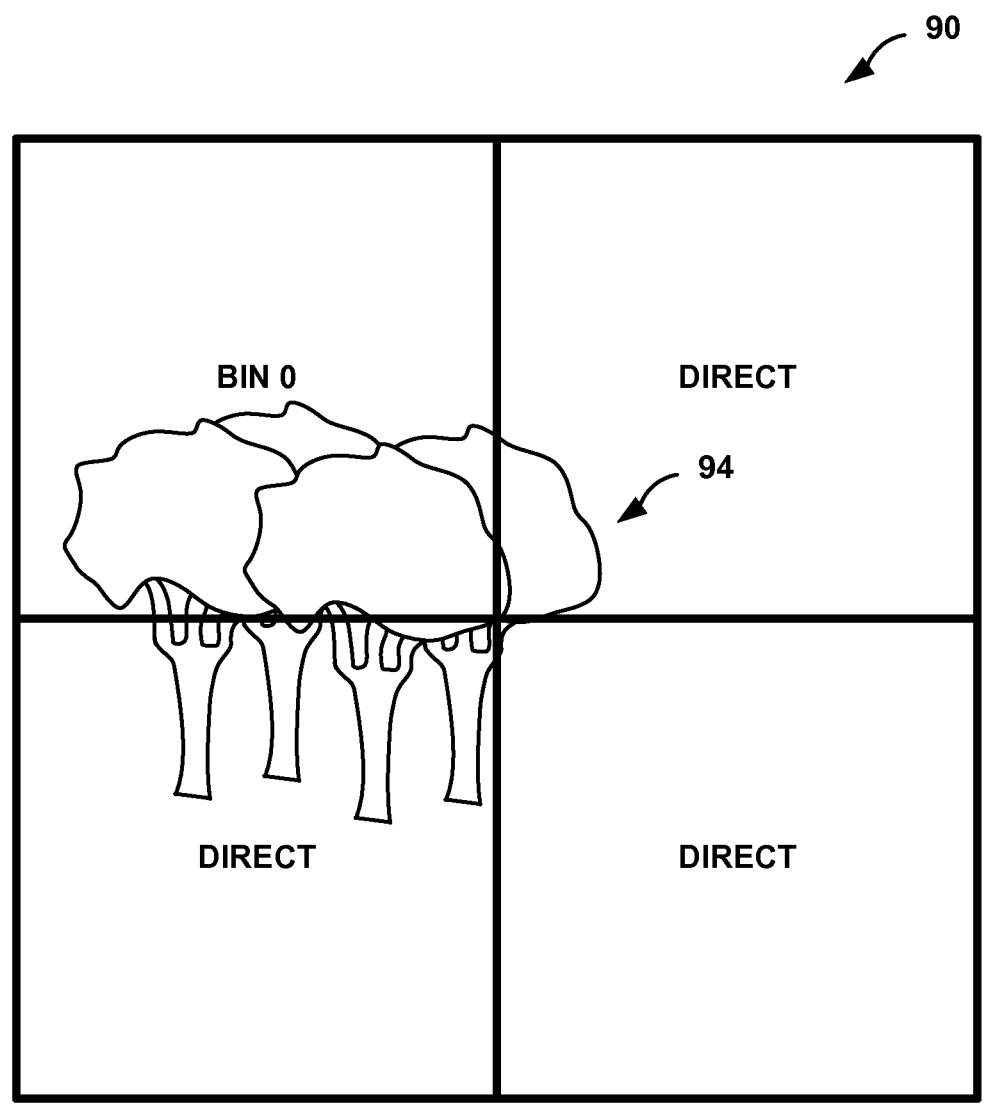
FIG. 4 is another diagram illustrating the image of FIG. 3

FIG. 4 is another block diagram illustrating the image of FIG. 3. The example of FIG. 4 generally illustrates a revised binning configuration for rendering image 90. For example, the revised binning configuration shown in FIG. 4 indicates whether to directly render one or more bins from the initial binning configuration shown in FIG. 3.

According to aspects of this disclosure, GPU 36 may generate heuristic data in addition to the visibility streams when performing the initial binning pass. The heuristic data may include, for example, the number of primitives in each of the bins, the number of visible primitives in each of the bins, the number of invisible primitives in each of the bins, the size of the primitives, and the like. In some examples, GPU 36 may also generate a visibility score based on the heuristic data and/or visibility streams. The visibility score may indicate a complexity of a bin, a relative amount of overdraw of a bin, and the like.

GPU 36 may send the visibility information (e.g., visibility streams, heuristic data, and/or visibility scores) to GPU driver 50. According to aspects of this disclosure, GPU driver 50 may revise the binning configuration based on the visibility information. For example, rather than being locked into the initial binning configuration (FIG. 3), GPU driver 50 may dynamically determine a revised binning configuration to optimize rendering.

In the example of FIG. 4, the revised binning configuration includes directly rendering bins from the initial binning configuration shown in FIG. 3. For example, GPU driver 50 may determine characteristics of the original bins 0-3 (FIG. 3) based on the visibility information. That is, GPU driver 50 may determine that bin 1, bin 2, and bin 3 of the original binning configuration have few primitives to be rendered and do not include a large amount of overdraw.

GPU driver 50 may revise the binning configuration to render bin 1, bin 2, and bin 3 of the original binning configuration using direct rendering. For example, GPU driver 50 may generate instructions for rendering bin 0 (which includes objects 94 with overdraw) using tile-based rendering and rendering bins 1-3 (which have few primitives and little overdraw) using direct rendering. Accordingly, GPU driver 50 drops bins 1-3 from the tile-based rendering passes and instead issues instructions for GPU 36 to render such bins using direct rendering.

In this way, GPU driver 50 optimizes the rendering pass of image 90. For example, tile-based rendering is used to render portions of image 90 in which the benefit of occluded primitive skipping outweighs the costs associated with the load and resolve stages. In addition, direct rendering is used to render portions of image 90 in which the load and resolve stages introduce unnecessary latency.

Figure 5:
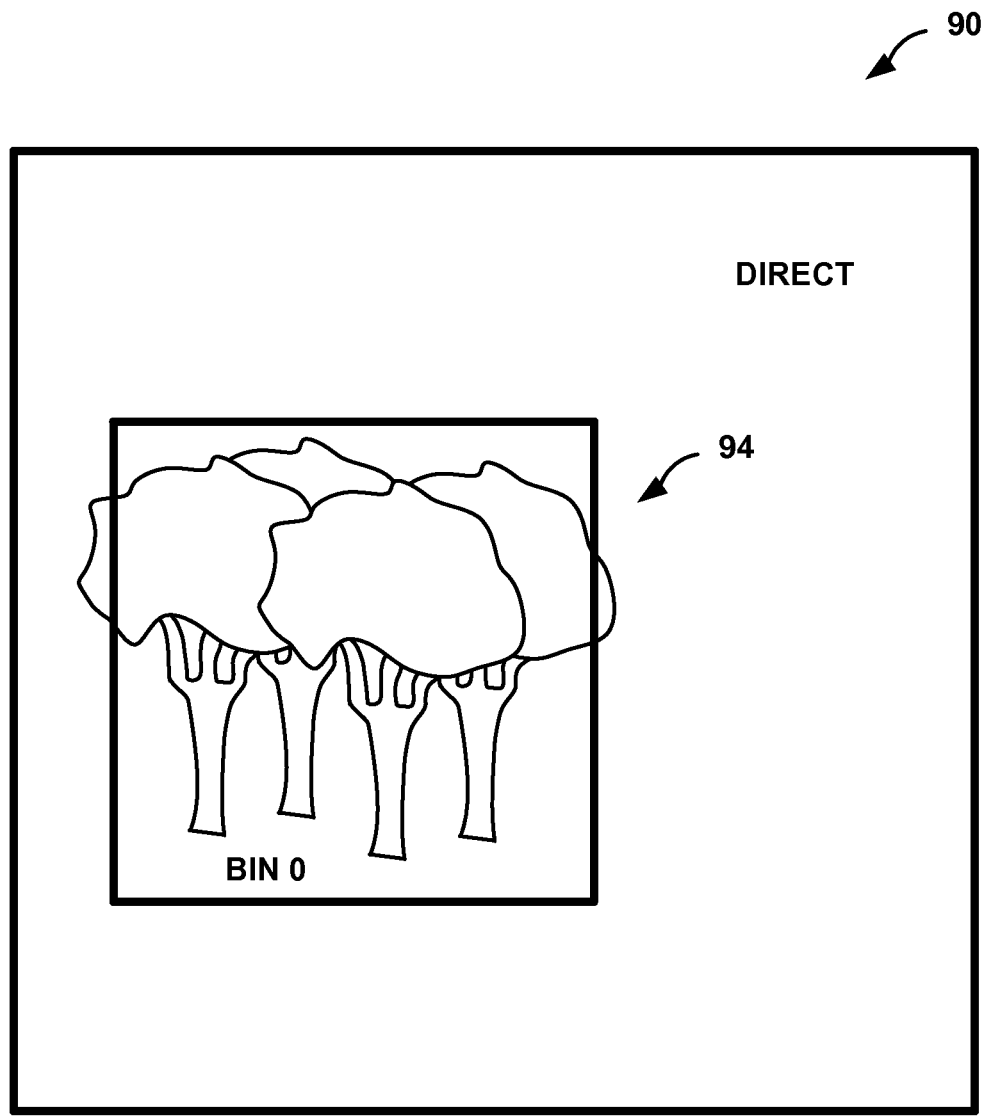
FIG. 5 is another diagram illustrating the image of FIG. 3.

FIG. 5 is another block diagram illustrating the image of FIG. 3. The example of FIG. 5 generally illustrates another revised binning configuration for rendering image 90. For example, the revised binning configuration shown in FIG. 5 includes a revised distribution of primitives 94 to new bin 0.

As noted above with respect to FIG. 4, according to aspects of this disclosure, GPU driver 50 may revise a binning configuration based on received visibility information. For example, rather than being locked into the initial binning configuration (FIG. 3), GPU driver 50 may dynamically determine a revised binning configuration to optimize rendering.

GPU driver 50 may initially determine characteristics of the original bins 0-3 (FIG. 3) based on the visibility information. That is, GPU driver 50 may determine that bin 1, bin 2, and bin 3 of the original binning configuration have few primitives to be rendered and do not include a large amount of overdraw. GPU driver 50 may then generate a new binning configuration with an alternative arrangement of bins.

In the example of FIG. 5, GPU driver 50 may determine a new bin 0 that includes objects 94. For example, GPU driver 50 may merge portions of the visibility streams for original bins 0-3 (FIG. 3) to generate a visibility stream for new bin 0. In this way, GPU driver 50 may alter the boundaries of original bins 0-3 to encompass objects 94.

Accordingly, GPU driver 50 may position new bin 0 to encompass the most complex area of image 90, while designating other portions of image 90 to be directly rendered ("direct"). In some examples, GPU driver 50 may use the visibility information to merge visibility streams until a predetermined complexity metric is attained. For example, GPU driver 50 may merge portions of the initial configuration of bins based on a restricted region growing algorithm. If the complexity metric cannot be attained, GPU driver 50 may designate the remaining portions of the bins to be directly rendered.

In the example of FIG. 5, GPU driver 50 may implement a region growing algorithm that begins growing a region around objects 94. GPU driver 50 may continue growing the region until a predetermined bin size has been achieved, thereby creating new bin 0. GPU driver 50 may then begin another region growing algorithm. Because the remaining portion of image 90 is not complex, e.g., has relatively few primitives with relatively little overdraw, GPU driver 50 may designate the remaining portion of image 90 to be directly rendered (with no binning and/or visibility information).

In this way, GPU driver 50 optimizes the rendering pass of image 90. For example, tile-based rendering is used to render portions of image 90 in which the benefit of occluded primitive skipping outweighs the costs associated with the load and resolve stages. In addition, direct rendering is used to render portions of image 90 in which the load and resolve stages introduce unnecessary latency.

According to some examples, GPU driver 50 may utilize a particular binning arrangement for more than one image (frame). For example, with respect to FIG. 5) upon optimizing the rendering pass for image 90, GPU driver 50 may apply the optimized binning configuration associated with image 90 to one or more other images in a sequence of images. That is, in recognition that portions of an image may not change significantly in a sequence of images (e.g., background objects), GPU driver 50 may utilize the optimized binning configuration for image 90 as an initial binning configuration for one or more subsequent images. In this way, GPU driver 50 may only perform the optimization described with respect to FIGS. 4 and 5 for a subset of images in a sequence of images.

While the examples shown in FIGS. 3-5 are described with respect to computing device 30, it should be understood that the techniques may be performed by a variety of other computing devices having a variety of other components.

Figure 6:
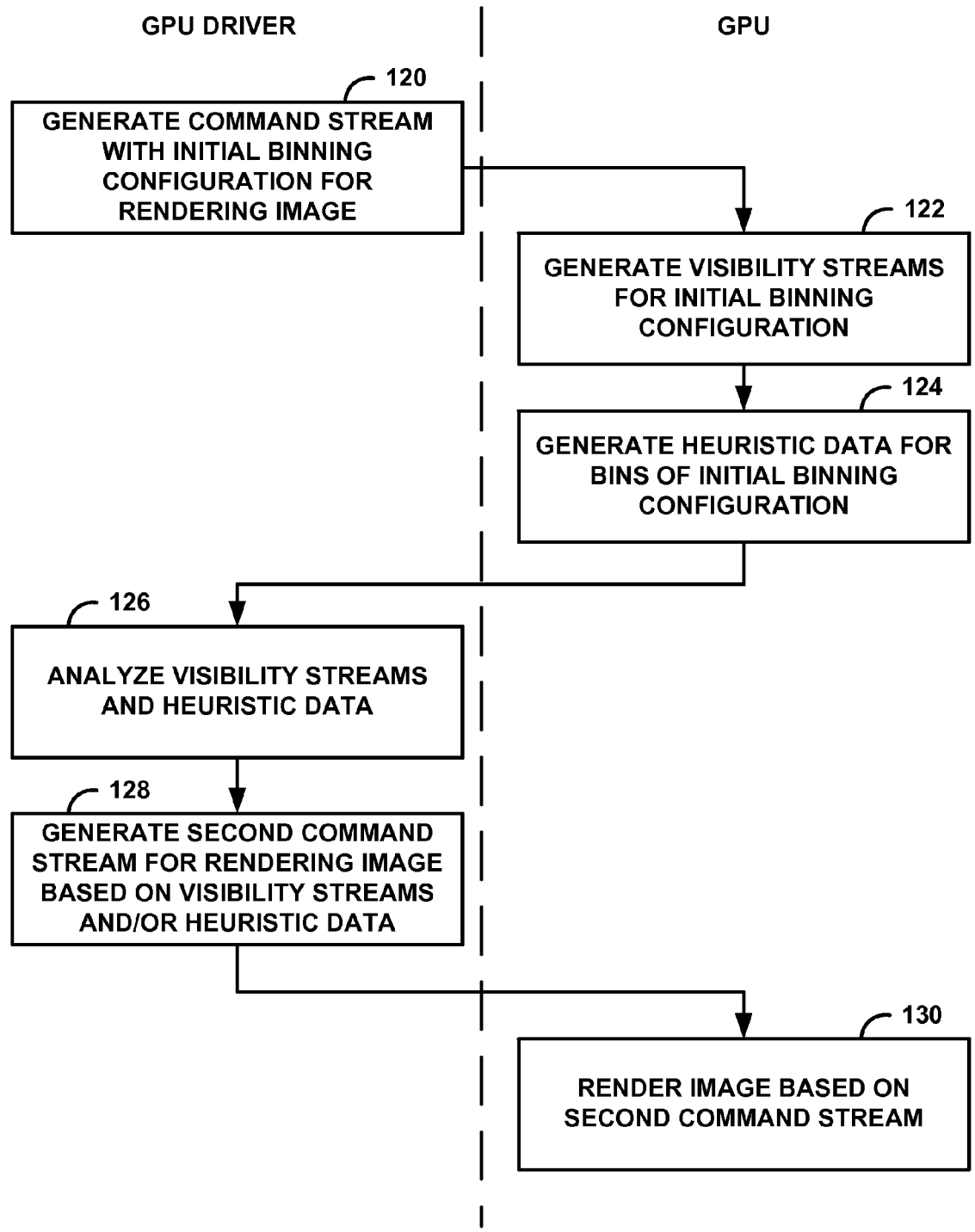
FIG. 6 is a flow diagram illustrating an example process for rendering graphics, according to aspects of this disclosure.

FIG. 6 is a flow diagram illustrating an example binning process. While the process shown in FIG. 6 is described as being carried out by CPU 32 and/or GPU 36 (FIGS. 1 and 2), the techniques may be implemented by a variety of other processing units.

In the example of FIG. 6, GPU driver 50, executed by CPU 32, initially generates an initial command stream with an initial binning configuration for rendering graphics data (120). For example, GPU driver 50 may be configured to determine a bin size based on the configuration of GPU 36, such as a size of GPU memory 38. GPU driver 50 may also be configured to apply a predetermined bin arrangement using bins of the determined bin size.

GPU 36 may then determine visibility streams for the initial binning configuration (122). For example, GPU 36 may process the command stream to generate primitives of the image being rendered. GPU 36 may also distribute the primitives to the bins of the initial binning configuration. GPU 36 may generate visibility streams to indicate which primitives are visible in each bin.

According to aspects of this disclosure, GPU 36 may also generate heuristic data for the bins of the initial binning configuration (124). The heuristic data may include, for example, the number of primitives in each of the bins, the number of visible primitives in each of the bins, the number of invisible primitives in each of the bins, the size of the primitives, and the like. In some examples, GPU 36 may use the visibility streams and/or heuristic data to assign a visibility score to each bin. The visibility score may indicate a complexity of the bin, an amount of overdraw of the bin, and the like.

GPU driver 50 may receive the visibility streams and heuristic data and may analyze the visibility information (126). For example, GPU driver 50 may determine the complexity of the image, identify areas of the image having overdraw, and the like. GPU driver 50 may also use the visibility information to generate a second command stream, different form the initial command stream, for rendering the data based on visibility streams and/or heuristic data (128). For example, GPU driver 50 may designate one or more of the bins from the initial binning configuration to be directly rendered. In another example, GPU driver 50 may generate a new binning configuration, different from the initial binning configuration, that includes one or more new bins.

GPU 36 may receive the second command stream and render the image based on the second command stream (130). That is, GPU 36 may determine pixel values for pixels of the image using the second command stream and may output the image for presentation.

It should be understood that the steps shown in FIG. 6 are provided as merely one example. That is, the steps shown in FIG. 6 need not necessarily be performed in the order shown, and fewer, additional, or alternative steps may be performed. Moreover, while certain functions are ascribed to GPU driver 50 and GPU 36, such functions may be performed by different components. For example, according to an alternative aspect, GPU driver 50 may be responsible for generating heuristic data from raw visibility streams, rather than GPU 36 as described above.

In addition, FIG. 6 is described with respect to an initial binning configuration and a revised binning configuration. The techniques of this disclosure are not limited in this way. For example, GPU 36 may generate visibility information for an entire image, without considering an initial binning configuration. In this example, GPU driver 50 may generate an optimal command stream for rendering the data based on visibility information for the entire image.

Figure 7:
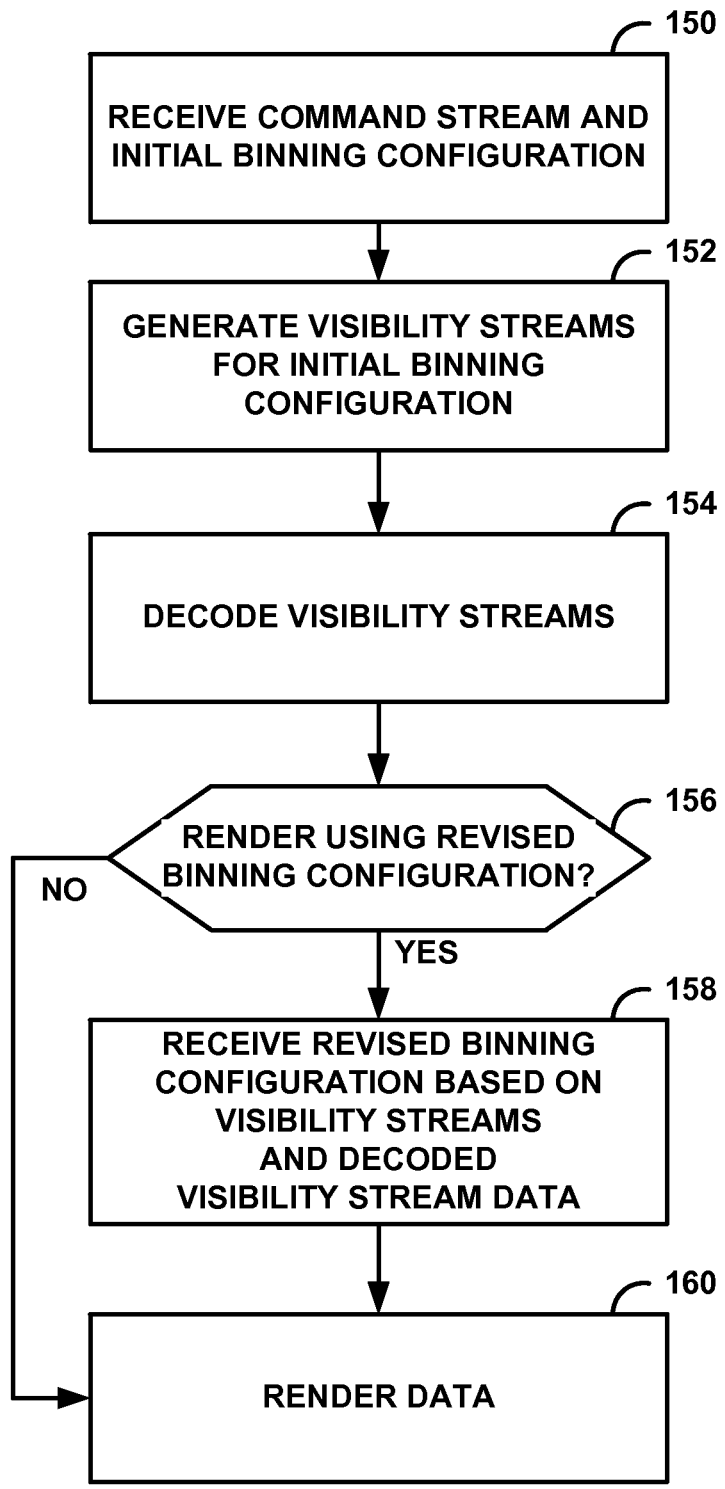
FIG. 7 is a flow diagram illustrating another example process for rendering graphics, according to aspects of this disclosure.

FIG. 7 is a flow diagram illustrating an example process for rendering graphics, according to aspects of this disclosure. While the process shown in FIG. 7 is described as being carried out by GPU 36 (FIGS. 1 and 2), the techniques may be implemented by a variety of other processing units.

In the example of FIG. 7, a GPU, such as GPU 36, receives a command stream having an initial binning configuration for rendering an image of graphics data (150). The command stream may include instructions describing the image. GPU 36 may generate one or more visibility streams for the initial binning configuration (152). For example, GPU 36 may generate primitives for the image using the command stream. GPU 36 may identify visible primitives in the image and indicate the visible primitives in a command stream using a series of flags. Visibility streams may be generated on a bin-by-bin basis, or for the entire image.

GPU 36 may also decode the generated visibility streams (154). For example, GPU 36 may generate data describing the bins. That is, GPU 36 may indicate a number of primitives in each bin, a number of visible primitives in each bin, a number of invisible primitives in each bin, a size of the primitives, and the like. In some instances, GPU 36 may also assign a score to the bins. The score may indicate an overall complexity of each bin, an amount of overdraw for each bin, and the like. GPU 36 may provide this decoded visibility data with the visibility streams (e.g., appended to the end of the visibility streams) or may provide the decoded visibility data separately.

GPU 36 may determine whether to render the image using the initial binning configuration, or whether to use a revised binning configuration during rendering (156). For example, GPU 36 may receive a command stream for rendering the image that has a different binning configuration than the initial binning configuration. The different binning configuration may be based on the visibility streams and/or the data describing the bins (decoded visibility streams). The determination may be made based on an instruction from a driver issuing the command stream for rendering the image, such as GPU driver 50.

If a revised binning configuration is used (the "yes" branch of step 156) GPU 36 may receive a revised binning configuration based on the visibility streams and decoded visibility stream data (158). GPU 36 may then render the image using the revised binning configuration (160). If a revised binning configuration is not used (the "no" branch of step 156) GPU may render the image using the initial binning configuration (160).

It should be understood that the steps shown in FIG. 7 are provided as merely one example. That is, the steps shown in FIG. 7 need not necessarily be performed in the order shown, and fewer, additional, or alternative steps may be performed.

Figure 8:
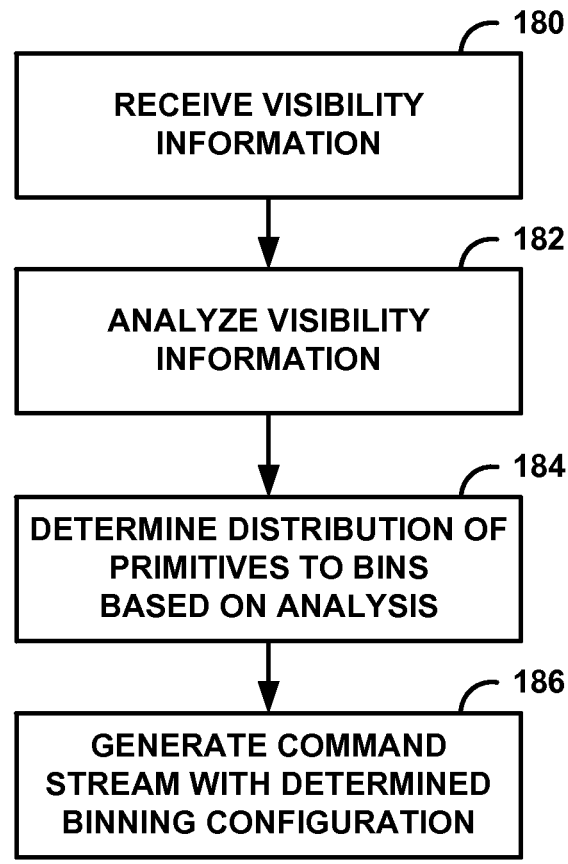
FIG. 8 is a flow diagram illustrating another example process for rendering graphics, according to aspects of this disclosure.

FIG. 8 is a flow diagram illustrating another example process for rendering graphics, according to aspects of this disclosure. While the process shown in FIG. 8 is described as being carried out by CPU 32 (via GPU driver 50) (FIGS. 1 and 2), the techniques may be implemented by a variety of other processing units.

In the example of FIG. 8, a GPU driver (such as GPU driver 50) may receive visibility information (180) associated with bins of an image being rendered by a GPU (such as GPU 36). The visibility information may include, for example, one or more visibility streams, as well as decoded visibility data. For example, GPU driver 50 may receive data indicating a number of primitives in each bin, data indicating a number of visible primitives in each bin, data indicating a number of invisible primitives in each bin, data indicating a size of the primitives, and the like. In some instances, GPU driver 50 may also receive a score for each bin. The score may indicate an overall complexity of each bin, an amount of overdraw for each bin, and the like.

GPU driver 50 may analyze the visibility information (182). In some examples, GPU driver 50 may merge visibility streams until a predetermined complexity metric is attained. For example, GPU driver 50 may merge portions of visibility streams based on a restricted region growing algorithm. In other examples, GPU driver 50 may compare a received visibility score to a threshold.

GPU driver 50 may also determine a distribution of primitives to bins based on the analysis (184). For example, GPU driver 50 may designate areas of an image having a relatively large amount of overdraw for tile-based rendering. In this example, GPU driver 50 may generate one or more bins encompassing the designated areas. In addition, GPU driver 50 may generate one or more visibility streams for the bins. These bins may be used by GPU 36 to perform tile-based rendering for the designated areas. GPU driver 50 may also designate areas having a relatively small amount of overdraw for direct rendering. In these areas, GPU driver 50 may not generate visibility streams, as such information is not required for direct rendering.

GPU driver 50 may, in some instances, generate an initial binning configuration upon which the received visibility information (from step 180) is generated. In this example, GPU driver 50 may determine whether to implement the initial binning configuration, or whether to revise the binning configuration based on the analysis.

For example, GPU driver 50 may designate one or more bins of the initial binning configuration for direct rendering based on the analysis above. That is, GPU driver 50 may designate bins to be directly rendered or tile-based rendered based on the complexity metric or visibility scores described above. In an example for purposes of illustration, if a visibility score is above a predetermined threshold (e.g., indicating high complexity and/or a large amount of overdraw), GPU driver 50 may designate the bin to be tile-based rendered. In contrast, if the visibility score is below the threshold (e.g., indicating few primitives and/or little overdraw), GPU driver 50 may designate the bin to be directly rendered.

In another example, GPU driver 50 may discard the initial binning configuration in favor of a new binning configuration. In this example, GPU driver 50 may generate one or more new bins based on the analysis. In addition, GPU driver 50 may generate one or more visibility streams for the bins, as noted above.

After determining the distribution of primitives to bins, GPU driver 50 may generate a command stream with instructions for rendering the image according to the determined binning configuration (186). The command stream may be executed by GPU 36 to render the image.

It should be understood that the steps shown in FIG. 8 are provided as merely one example. That is, the steps shown in FIG. 8 need not necessarily be performed in the order shown, and fewer, additional, or alternative steps may be performed.

It should also be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for rendering an image, the method comprising:
  generating, by one or more processors of a computing device, visibility information for an initial binning configuration that indicates an initial tile-based distribution of visible primitives of the image to one or more bins of the initial binning configuration; and
  rendering, by the one or more processors, the image using a revised binning configuration, wherein the revised binning configuration is based on the visibility information.

2. The method of claim 1,
  wherein the revised binning configuration comprises a revised tile-based distribution of the visible primitives to one or more different bins than the one or more bins of the initial binning configuration, and
  wherein rendering the image using the revised binning configuration comprises rendering the image using a combination of direct rendering and the one or more different bins of the revised binning configuration.

3. The method of claim 1, wherein the revised binning configuration comprises an indication of whether to directly render one or more bins from the initial binning configuration.

4. The method of claim 1, wherein the revised binning configuration comprises an indication of one or more new bins having a revised distribution of the visible primitives to the one or more new bins.

5. The method of claim 1, wherein generating visibility information comprises generating a visibility stream indicating the visible primitives, and generating heuristic data associated with primitives of the image, and wherein the revised binning configuration is based on at least one of the visibility stream and the heuristic data.

6. The method of claim 5, wherein generating the heuristic data comprises generating data indicating an amount of overdraw associated with the primitives.

7. The method of claim 5, wherein generating the heuristic data comprises generating data indicating a number of primitives in a predetermined area of the image.

8. The method of claim 5, wherein generating the heuristic data comprises generating data indicating a size of primitives in a predetermined area of the image.

9. The method of claim 1, further comprising displaying the rendered image at a display of the computing device.

10. An apparatus for rendering an image, the apparatus comprising:
  a memory configured to store at least a portion of the image; and
  one or more processors configured to:
    generate visibility information for an initial binning configuration that indicates an initial tile-based distribution of visible primitives of the image to one or more bins of the initial binning configuration; and
    render the image using a revised binning configuration, wherein the revised binning configuration is based on the visibility information.

11. The apparatus of claim 10,
  wherein the revised binning configuration comprises a revised tile-based distribution of the visible primitives to one or more different bins than the one or more bins of the initial binning configuration, and
  wherein to render the image using the revised binning configuration, the one or more processors are configured to render the image using a combination of direct rendering and the one or more different bins of the revised binning configuration.

12. The apparatus of claim 10, wherein the revised binning configuration comprises an indication of whether to directly render one or more bins from the initial binning configuration.

13. The apparatus of claim 10, wherein the revised binning configuration comprises an indication of one or more new bins having a revised distribution of the visible primitives to the one or more new bins.

14. The apparatus of claim 10, wherein to generate visibility information, the one or more processors are configured to generate a visibility stream indicating the visible primitives, and to generate heuristic data associated with primitives of the image, and wherein the revised binning configuration is based on at least one of the visibility stream and the heuristic data.

15. The apparatus of claim 14, wherein to generate the heuristic data, the one or more processors are configured to generate data indicating an amount of overdraw associated with the primitives.

16. The apparatus of claim 14, wherein to generate the heuristic data, the one or more processors are configured to generate data indicating a number of primitives in a predetermined area of the image.

17. The apparatus of claim 14, wherein to generate the heuristic data, the one or more processors are configured to generate data indicating a size of primitives in a predetermined area of the image.

18. The apparatus of claim 10, further comprising a display device configured to display the rendered image.

19. An apparatus for rendering an image, the apparatus comprising:
  means for generating visibility information for an initial binning configuration that indicates an initial tile-based distribution of visible primitives of the image to one or more bins of the initial binning configuration; and
  means for rendering the image using a revised binning configuration, wherein the revised binning configuration is based on the visibility information.

20. The apparatus of claim 19,
  wherein the revised binning configuration comprises a revised tile-based distribution of the visible primitives to one or more different bins than the one or more bins of the initial binning configuration, and
  wherein the means for rendering the image using the revised binning configuration comprises means for rendering the image using a combination of direct rendering and the one or more different bins of the revised binning configuration.

21. The apparatus of claim 19, wherein the means for generating visibility information comprises means for generating a visibility stream indicating the visible primitives, and means for generating heuristic data associated with primitives of the image, and wherein the revised binning configuration is based on at least one of the visibility stream and the heuristic data.

22. The apparatus of claim 19, further comprising means for displaying the rendered image.

23. A non-transitory computer-readable storage medium having instructions stored thereon that, when executed, cause one or more processors to:
  generate visibility information for an initial binning configuration that indicates an initial tile-based distribution of visible primitives of the image to one or more bins of the initial binning configuration; and
  render the image using a revised binning configuration, wherein the revised binning configuration is based on the visibility information.

24. The non-transitory computer-readable storage medium of claim 23,
wherein the revised binning configuration comprises a revised tile-based distribution of the visible primitives to one or more different bins than the one or more bins of the initial binning configuration, and
wherein to render the image using the revised binning configuration, the instructions cause the one or more processors to render the image using a combination of direct rendering and the one or more different bins of the revised binning configuration.

25. The non-transitory computer-readable storage medium of claim 23, wherein to generate visibility information, the instructions cause the one or more processors to generate a visibility stream indicating the visible primitives, and generate heuristic data associated with primitives of the image, and wherein the revised binning configuration is based on at least one of the visibility stream and the heuristic data.

26. The non-transitory computer-readable storage medium of claim 23, further comprising instructions that cause the one or more processors to display the rendered image at a display of a computing device.

27. A method for rendering an image, the method comprising:
receiving, by one or more processors of a computing device, visibility information for an initial binning configuration that indicates an initial tile-based distribution of visible primitives of the image to one or more first bins of the initial binning configuration; and
determining, by the one or more processors, a revised binning configuration comprising a distribution of the visible primitives of the image to one or more second bins based on the visibility information.

28. The method of claim 27, wherein receiving the visibility information comprises receiving a visibility stream and receiving heuristic data associated with the plurality of primitives.

29. The method of claim 28, wherein the heuristic data comprises data indicating an amount of overdraw associated with the plurality of primitives.

30. The method of claim 28, wherein the heuristic data comprises data indicating a number of primitives in a predetermined area of the image.

31. The method of claim 28, wherein the heuristic data comprises data indicating a size of primitives in a predetermined area of the image.

32. The method of claim 27, wherein the visibility information comprises a plurality of visibility streams, and determining the revised binning configuration comprises merging at least two of the visibility streams.

33. The method of claim 27, further comprising:
determining, by the one or more processors, the initial binning configuration comprising the initial tile-based distribution based on a predetermined bin arrangement and an amount of memory associated with a graphics processing unit (GPU) rendering the image.

34. The method of claim 33,
wherein determining the revised binning configuration comprises designating one or more of the one or more first bins to be directly rendered, such that the one or more second bins include the designated one or more first bins.

35. The method of claim 33,
wherein the revised binning configuration comprises a revised tile-based distribution of the visible primitives to one or more different bins, such that the one or more second bins are different than the one or more first bins.

36. An apparatus for rendering an image, the apparatus comprising:
one or more processors configured to:
receive visibility information for an initial binning configuration that indicates an initial tile-based distribution of visible primitives of the image to one or more first bins of the initial binning configuration;
determine a revised binning configuration comprising a distribution of the visible primitives of the image to one or more second bins based on the visibility information; and
a memory configured to store the revised binning configuration.

37. The apparatus of claim 36, wherein to receive the visibility information, the one or more processors are configured to receive a visibility stream and receive heuristic data associated with the plurality of primitives.

38. The apparatus of claim 37, wherein the heuristic data comprises data indicating an amount of overdraw associated with the plurality of primitives.

39. The apparatus of claim 37, wherein the heuristic data comprises data indicating a number of primitives in a predetermined area of the image.

40. The apparatus of claim 37, wherein the heuristic data comprises data indicating a size of primitives in a predetermined area of the image.

41. The apparatus of claim 36, wherein the visibility information comprises a plurality of visibility streams, and to determine the revised binning configuration, the one or more processors are configured to merge at least two of the visibility streams.

42. The apparatus of claim 36, wherein the one or more processors are further configured to:
determine the initial binning configuration comprising the initial tile-based distribution based on a predetermined bin arrangement and an amount of memory associated with a GPU rendering the image.

43. The apparatus of claim 42,
wherein to determine the revised binning configuration, the one or more processors are configured to designate one or more of the one or more first bins to be directly rendered, such that the one or more second bins include the designated one or more first bins.

44. The apparatus of claim 42,
wherein the revised binning configuration comprises a revised tile-based distribution of the visible primitives to one or more different bins, such that the one or more second bins are different than the one or more first bins.

45. An apparatus for rendering an image, the apparatus comprising:
means for receiving visibility information for an initial binning configuration that indicates an initial tile-based distribution of visible primitives of the image to one or more first bins of the initial binning configuration; and
means for determining a revised binning configuration comprising a distribution of the visible primitives of the image to one or more second bins based on the visibility information.

46. The apparatus of claim 45, wherein the visibility information comprises a plurality of visibility streams, and the means for determining the revised binning configuration comprises means for merging at least two of the visibility streams.

47. The apparatus of claim 45, further comprising:
means for determining the initial binning configuration comprising the initial tile-based distribution based on a predetermined bin arrangement and an amount of memory associated with a GPU rendering the image.

48. The apparatus of claim 47,
wherein the means for determining the revised binning configuration comprises means for designating one or more of the one or more first bins to be directly rendered, such that the one or more second bins include the designated one or more first bins.

49. The apparatus of claim 47,
wherein the revised binning configuration comprises a revised tile-based distribution of the visible primitives to one or more different bins, such that the one or more second bins are different than the one or more first bins.

50. A non-transitory computer-readable storage medium having instructions stored thereon that, when executed, cause one or more processors to:
receive visibility information for an initial binning configuration that indicates an initial tile-based distribution of visible primitives of the image to one or more first bins of the initial binning configuration; and
determine a revised binning configuration comprising a distribution of the visible primitives of the image to one or more second bins based on the visibility information.

51. The non-transitory computer-readable storage medium of claim 50, wherein the visibility information comprises a plurality of visibility streams, and to determine the revised binning configuration, the instructions cause the one or more processors to merge at least two of the visibility streams.

52. The non-transitory computer-readable storage medium of claim 50, further comprising instructions that cause the one or more processors to:
determine the initial binning configuration comprising the initial tile-based distribution based on a predetermined bin arrangement and an amount of memory associated with a GPU rendering the image.

53. The non-transitory computer-readable storage medium of claim 52,
wherein to determine the revised binning configuration, the instructions cause the one or more processors to designate one or more of the one or more first bins to be directly rendered, such that the one or more second bins include the designated one or more first bins.

54. The non-transitory computer-readable storage medium of claim 52,
wherein the revised binning configuration comprises a revised tile-based distribution of the visible primitives to one or more different bins, such that the one or more second bins are different than the one or more first bins.

* * * * *